United States Patent
Byun et al.

(10) Patent No.: US 9,299,974 B2
(45) Date of Patent: Mar. 29, 2016

(54) RECHARGEABLE BATTERY

(71) Applicant: SAMSUNG SDI CO., LTD., Yongin-si, Gyeonggi-do (KR)

(72) Inventors: Sang-Won Byun, Yongin-si (KR);
Soo-Seok Choi, Yongin-si (KR);
Jeong-Won Oh, Yongin-si (KR);
Hyung-Sik Kim, Yongin-si (KR);
Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 263 days.

(21) Appl. No.: 14/035,854

(22) Filed: Sep. 24, 2013

(65) Prior Publication Data

US 2014/0315055 A1 Oct. 23, 2014

(30) Foreign Application Priority Data

Apr. 17, 2013 (KR) .................. 10-2013-0042376

(51) Int. Cl.
*H01M 2/00* (2006.01)
*H01M 2/34* (2006.01)
*H01M 2/26* (2006.01)

(52) U.S. Cl.
CPC ........ *H01M 2/34* (2013.01); *H01M 2/26* (2013.01); *H01M 2/348* (2013.01); *H01M 2200/103* (2013.01)

(58) Field of Classification Search
CPC ..... H01M 2/34; H01M 2/30; H01M 10/5032; H01M 2/263; H01M 10/5051; H01M 10/5026; H01M 2200/103
See application file for complete search history.

(56) References Cited

U.S. PATENT DOCUMENTS

2011/0081560 A1* 4/2011 Kim et al. .................. 429/7
2011/0300419 A1* 12/2011 Byun .................. 429/61

FOREIGN PATENT DOCUMENTS

| JP | 5-274994 | 10/1993 |
| JP | 2006-12602 | 1/2006 |
| KR | 10-2011-0133255 | 12/2011 |

* cited by examiner

*Primary Examiner* — Patrick Ryan
*Assistant Examiner* — Ben Lewis
(74) *Attorney, Agent, or Firm* — Lewis Roca Rothgerber Christie LLP

(57) ABSTRACT

A rechargeable battery including: an electrode assembly; a case accommodating the electrode assembly; a cap plate covering an opening of the case; an electrode terminal on the cap plate; and a lead tab connecting the electrode assembly to the electrode terminal, and including a fuse, the fuse including a plurality of sub-fuses defined along a width of the lead tab by a plurality of through holes formed in the lead tab.

10 Claims, 11 Drawing Sheets

RECHARGEABLE BATTERY

CROSS-REFERENCE TO RELATED APPLICATION

This application claims priority to and the benefit of Korean Patent Application No. 10-2013-0042376, filed in the Korean Intellectual Property Office on Apr. 17, 2013, the entire content of which is incorporated herein by reference.

BACKGROUND

1. Field

Aspects of embodiments of the present invention relate to a rechargeable battery.

2. Description of the Related Art

A rechargeable battery can be repeatedly charged and discharged, unlike a primary battery. A low-capacity rechargeable battery is typically used for small portable electronic devices, such as a mobile phone, a notebook computer, and a camcorder, and a large-capacity rechargeable battery may be used as a power supply for driving a motor, such as for a hybrid vehicle or an electric vehicle.

An example of a rechargeable battery includes an electrode assembly for performing charging and discharging operations, a case accommodating the electrode assembly, a cap plate coupled to an opening of the case, and a lead tab for electrically connecting the electrode assembly to an electrode terminal.

In the rechargeable battery, the lead tab may have a fuse formed between a part connected to the electrode assembly and a part connected to the electrode terminal. For example, the fuse may melt under a high-voltage condition, such as external short-circuiting, to thus interrupt current.

When the fuse operates, i.e. melts, in which some part is broken and the other part is connected, current may be concentrated at the connected part, and an arc may be increasingly generated at the broken part. Accordingly, the remains of the arc may reconnect the broken fuse.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery reduces arc energy by distributing current when a fuse operates. According to an aspect of embodiments of the present invention, a rechargeable battery includes a fuse at a lead tab.

According to one or more embodiments of the present invention, a rechargeable battery includes: an electrode assembly; a case accommodating the electrode assembly; a cap plate covering an opening of the case; an electrode terminal on the cap plate; and a lead tab connecting the electrode assembly to the electrode terminal, and including a fuse, the fuse including a plurality of sub-fuses defined along a width of the lead tab by a plurality of through holes formed in the lead tab.

The fuse may have a second thickness that is less than a first thickness of a surrounding portion of the lead tab.

The lead tab may include an inclined surface extending on at least one side of the fuse in a lengthwise direction intersecting the width, and the inclined surface may connect from a surface of the surrounding portion of the lead tab to a surface of the fuse.

The inclined surface may be on one surface of the lead tab in a thickness direction.

The through holes may have a same hole width, and the sub-fuses may have a same line width.

The sub-fuses may be concentrated on one side of the lead tab in a thickness direction.

The inclined surface may be on both sides of the lead tab in a thickness direction.

The sub-fuses may be arranged at a center of a thickness of the lead tab.

The through holes may have a same hole width, and line widths of the sub-fuses may gradually increase toward a side of the fuse.

The through holes have a same hole width, and thicknesses of the sub-fuses may gradually increase from one side of the fuse toward an opposite side of the fuse.

The lead tab may include an insulator in which the fuse is embedded.

The insulator may include a magnetic insulating material.

According to an aspect of embodiments of the present invention, the sub-fuses may melt at time intervals since the fuse is provided as sub-fuses at the lead tab. The arc energy gradually decreases because the sub-fuses melt while distributing current. That is, taking the fuse as a whole, the cross-sectional area of the sub-fuses, which allow current to flow, becomes smaller as the melting proceeds.

The sub-fuses may melt sequentially, and the arc force may be the greatest at the last sub-fuse that melts. However, the last sub-fuse to melt can contribute to minimizing or reducing arc length since it has the smallest cross-sectional area. That is, the arc force is low at the initial melting phase, which results in a decreased arc length, and the cross-sectional area of the fuse is small, which results in a decreased arc length.

BRIEF DESCRIPTION OF THE DRAWINGS

The above and other features and aspects of the present invention will become more apparent by describing in further detail some exemplary embodiments thereof with reference to the attached drawings.

Figure 1:
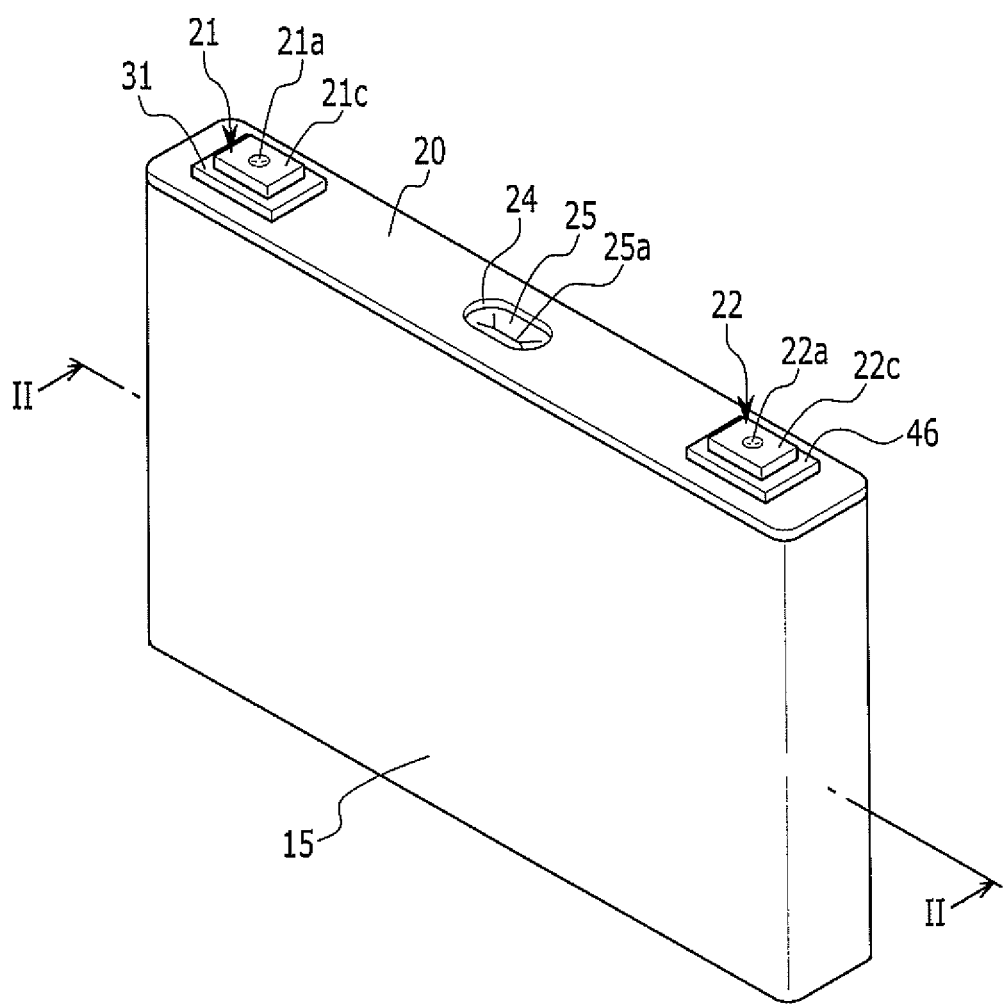
FIG. 1 is a perspective view of a rechargeable battery in accordance with an exemplary embodiment of the present invention.

Description of Reference Numerals Indicating Some Elements in the Drawings

| | |
|---|---|
| 10: electrode assembly | 11: negative electrode |
| 12: positive electrode | 11a, 12a: coated region |
| 11b, 12b: uncoated region | 13: separator |
| 15: case | 20: cap plate |
| 21, 22: electrode terminal | 21a, 22a: rivet terminal |
| 21b, 22b: flange | 21c, 22c: plate terminal |
| 21d: downward protrusion | 24: vent hole |
| 25: vent plate | 25a: notch |
| 31, 61, 62: insulating member | 36, 37: gasket |
| 46: top plate | 51, 52, 251, 351, 451: lead tab |
| 54: insulator | 71, 72, 371, 471: fuse |
| 73, 74: pass-through opening | 511: first connection part |
| 512, 513, 514, 515: second connection part | 711, 714, 715: sub-fuses |
| 712, 713: inclined surface | H1, H2: terminal hole |
| H3, H4, H7, H8, H9: through hole | t1, t2: first and second thicknesses |
| t3: maximum thickness | t4: minimum thickness |
| WH: hole width | WL: line width |

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals generally designate like elements throughout the specification.

Figure 2:
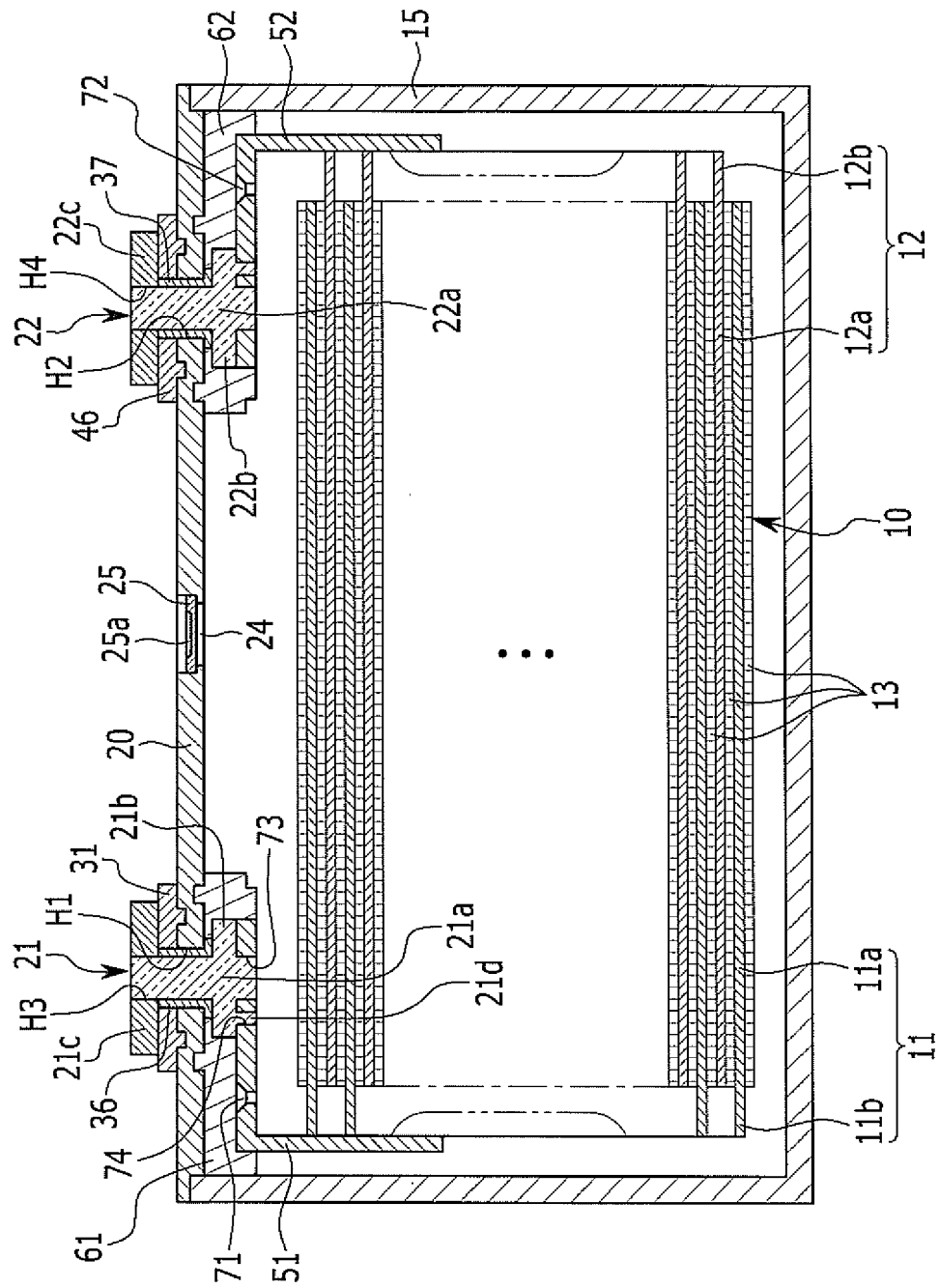
FIG. 2 is a cross-sectional view of the rechargeable battery of FIG. 1, taken along the line II-II.

FIG. 1 is a perspective view of a rechargeable battery in accordance with an exemplary embodiment of the present invention. FIG. 2 is a cross-sectional view of the rechargeable battery of FIG. 1, taken along the line II-II. Referring to FIGS. 1 and 2, a rechargeable battery in accordance with an exemplary embodiment of the present invention includes an electrode assembly for performing charging and discharging operations, a case 15 accommodating the electrode assembly 10, a cap plate 20 coupled to an opening of the case 15, electrode terminals 21 and 22 installed on the cap plate 20, and lead tabs 51 and 52 connecting the electrode terminals 21 and 22 to the electrode assembly 10.

In one embodiment, the electrode assembly 10 is formed by disposing electrodes (e.g., a negative electrode 11 and a positive electrode 12) on both surfaces of the separator 13, which is an insulator, and winding the negative electrode 11, the separator 13, and the positive electrode 12 in a jelly roll shape.

In one embodiment, the negative and positive electrodes 11 and 12 each includes a coated region 11a, 12a, formed by applying an active material to a current collector of a metal plate, and an uncoated regions 11b, 12b, which is an exposed portion of the respective current collector to which the respective active material is not applied.

The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12. The uncoated regions 11b and 12b, in one embodiment, are respectively disposed at opposite ends of the electrode assembly 10.

The case 15 may have an approximately cuboid shape such that an internal space for housing the electrode assembly 10 is defined. An opening between an exterior and the internal space may be formed on one side of the case 15, and the electrode assembly 10 may be inserted into the case 15 through the opening.

The cap plate 20 is installed in the opening of the case 15 to close and seal the case 15. In one embodiment, for example, the case 15 and the cap plate 20 may be formed of aluminum and welded to each other. That is, after the electrode assembly 10 is inserted into the case 15, the cap plate 20 may be welded to the opening of the case 15.

The cap plate 20, in one embodiment, has at least one opening, including terminal holes H1 and H2 and a vent hole 24. The electrode terminals 21 and 22 are respectively installed in the terminal holes H1 and H2 of the cap plate 20, and electrically connected to the electrode assembly 10.

That is, the electrode terminals 21 and 22 are electrically connected to the negative electrode 11 and positive electrode 12 of the electrode assembly 10, respectively. Accordingly, the electrode assembly 10 may be drawn out of the case 15 through the electrode terminals 21 and 22.

The electrode terminals 21 and 22, in one embodiment, include plate terminals 21c and 22c provided on the outside of the cap plate 20, corresponding to the terminal holes H1 and H2, and rivet terminals 21a and 22a electrically connected to the electrode assembly 10, and fastened to the plate terminals 21c and 22c through the terminals holes H1 and H2.

The plate terminals 21c and 22c have through holes H3 and H4. The rivet terminals 21a and 22a penetrate from the top into the through holes H3 and H4 and pass through the terminal holes H1 and H2 of the cap plate 20. The electrode terminals 21 and 22, in one embodiment, further include flanges 21b and 22b extended integrally with the rivet terminals 21a and 22a inside the cap plate 20.

In one embodiment, at the electrode terminal 21 to be connected to the negative electrode 11, an external insulating member 31 is interposed between the plate terminal 21c and the cap plate 20, thus electrically insulating the plate terminal 21c from the cap plate 20. That is, the cap plate 20 remains electrically insulated from the electrode assembly 10 and the negative electrode 11.

The insulating member 31 and the plate terminal 21c are fastened to the upper end of the rivet terminal 21a by coupling the insulating member 31 and the plate terminal 21c to the upper end of the rivet terminal 21a and riveting or welding the upper end. The plate terminal 21c is installed at the outside of the cap plate 20, with the insulating member 31 interposed therebetween.

In one embodiment, at the electrode terminal 22 to be connected to the positive electrode 12, a conductive top plate 46 is interposed between the plate terminal 22c and the cap plate 20.

The top plate 46 and the plate terminal 22c are fastened to the upper end of the rivet terminal 22a by coupling the top plate 46 and the plate terminal 22c to the upper end of the rivet terminal 22a and riveting or welding the upper end. The plate terminal 22c is installed at the outside of the cap plate 20, with the top plate 46 interposed therebetween.

Gaskets 36 and 37 are disposed between the rivet terminals 21a and 22a of the electrode terminals 21 and 22 and the inner surfaces of the cap plate 20 defining the terminal holes H1 and H2 of the cap plate 20, to seal and electrically insulate between the rivet terminals 21a and 22a and the cap plate 20.

The gaskets 36 and 37, in one embodiment, extend between the flanges 21b and 22b and the inner surface of the cap plate 20 to seal and electrically insulate between the flanges 21b and 22b and the cap plate 20. The gaskets 36 and 37 are installed with the electrode terminals 21 and 22 on the cap plate 20 to prevent or substantially prevent the electrolyte from leaking through the terminal holes H1 and H2.

The lead tabs 51 and 52 electrically connect the electrode terminals 21 and 22 to the negative and positive electrodes 11 and 12 of the electrode assembly 10. That is, the lead tabs 51 and 52 are connected to the lower ends of the rivet terminals 21a and 22a while being supported by the flanges 21b and 22b, by coupling the lead tabs 51 and 52 to the lower ends of the rivet terminals 21a and 22a to caulk the lower ends thereof.

The lead tabs 51 and 52 further include fuses 71 and 72 to interrupt current between the electrode terminals 21 and 22 and the electrode assembly 10. As shown in FIG. 2, the fuses 71 and 72 may be formed at the lead tabs 51 and 52 connected to the negative electrode 11 and the positive electrode 12 of the electrode assembly 10. In another embodiment, though not shown, one of the fuses 71 and 72 may be selectively formed at the negative electrode 11 or the positive electrode 12. According to embodiments of the present invention, the fuses 71 and 72 are configured to distribute current when they melt so as to reduce arc length.

In one embodiment, insulating members 61 and 62 are installed between the lead tabs 51 and 52 and the cap plate 20 to electrically insulate the lead tabs 51 and 52 form the cap plate 20. One side of each of the insulating members 61 and 62 may be coupled to the cap plate 20, and the other side thereof may surround respective ones of the lead tabs 51 and 52, the rivet terminals 21a and 22a, and the flanges 21b and 22b, thereby stabilizing the connection structure thereof.

The vent hole 24 is closed and sealed with a vent plate 25 so as to discharge an internal pressure of the rechargeable battery and gases generated in the rechargeable battery. When the internal pressure of the rechargeable battery reaches a certain pressure (e.g., a predetermined value), the vent plate 25 is ruptured to open the vent hole 24. The vent plate 25 may have a notch 25a for inducing the rupturing.

Figure 3:
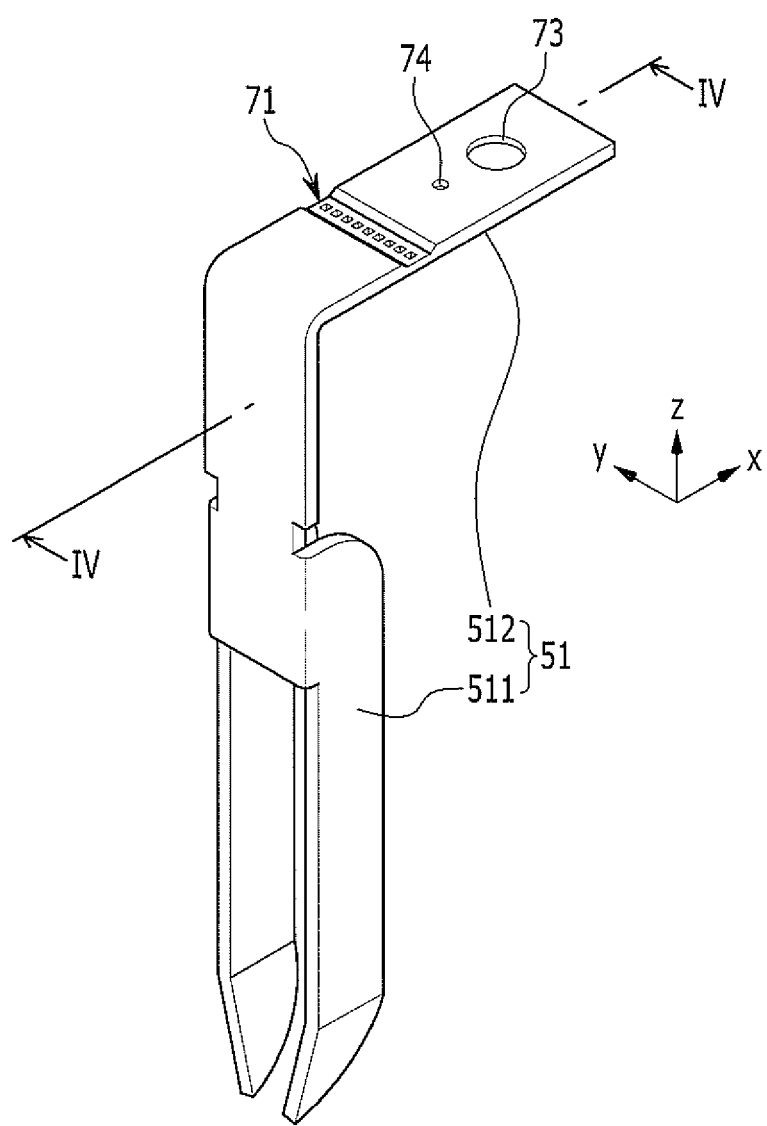
FIG. 3 is a perspective view of a lead tab of the rechargeable battery of FIG. 1, in accordance with an exemplary embodiment of the present invention.
Figure 4:
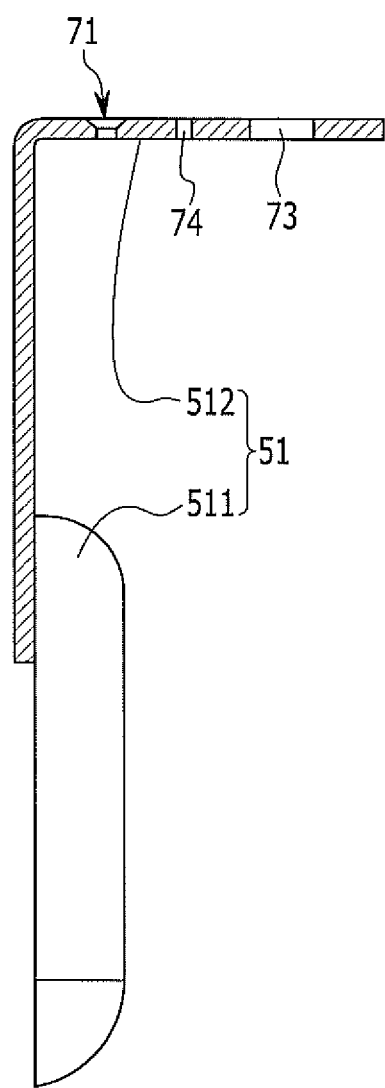
FIG. 4 is a cross-sectional view of the lead tab of FIG. 3, taken along the line IV-IV.

FIG. 3 is a perspective view of the lead tab 51. FIG. 4 is a cross-sectional view of the lead tab 51, taken along the line IV-IV of FIG. 3. The lead tabs 51 and 52 may be formed in the same manner, so a description thereof will be given below with respect to the lead tab 51 to be connected to the negative electrode 11, for convenience.

Referring to FIGS. 3 and 4, in one embodiment, the lead tab 51 includes a first connection part 511 connected to the negative uncoated region 11b of the electrode assembly 10, and a second connection part 512 bent from the first connection part 511 to be connected to the rivet terminal 21a of the electrode terminal 21.

The second connection part 512 may include pass-through openings 73 and 74 to be coupled to the lower end of the rivet terminal 21a and a downward protrusion 21d of the flange 21b. The fuse 71 has a smaller cross-sectional area than surrounding portions of the second connection part 512, and, therefore, has a higher electrical resistance than the surrounding portions of the second connection part 512. Thus, the fuse 71 may melt more quickly than the surrounding portions of the second connection part 512 when a high voltage is applied.

Figure 5:
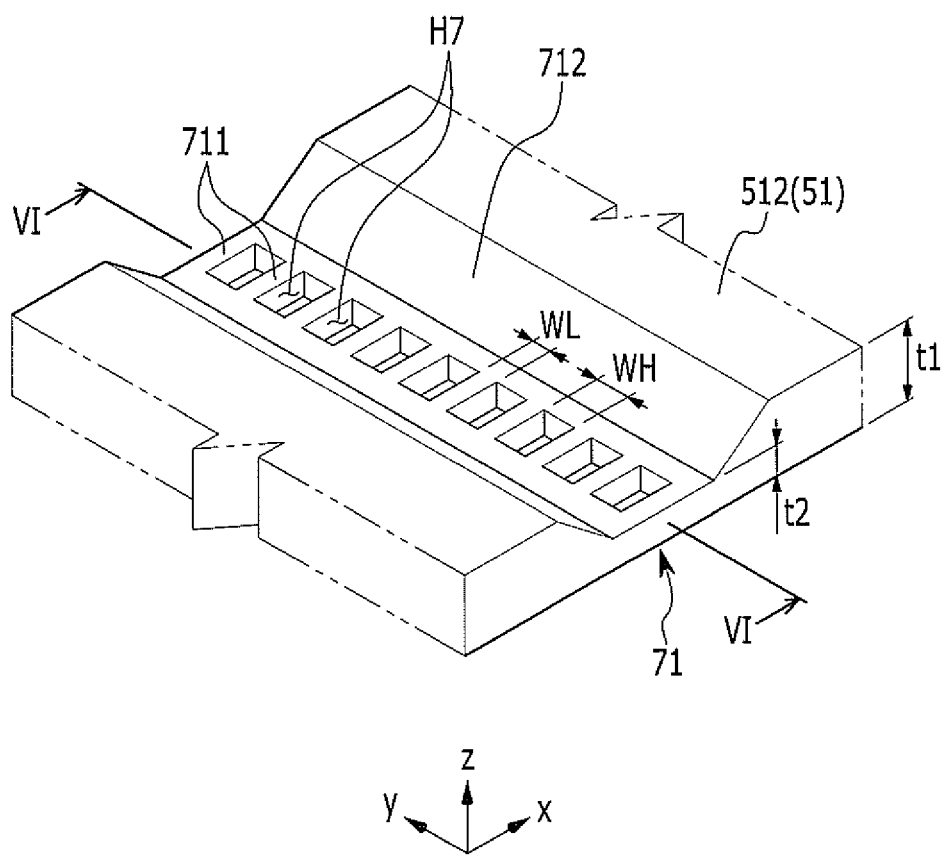
FIG. 5 is a perspective view of a region of the lead tab of FIG. 3 including a fuse.
Figure 6:
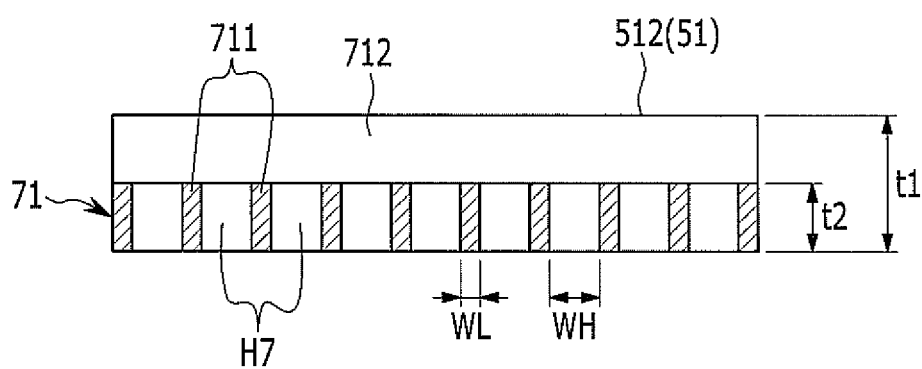
FIG. 6 is a cross-sectional view taken along the line VI-VI of FIG. 5.

FIG. 5 is an enlarged perspective view of a region of the lead tab 51 including the fuse 71. FIG. 6 is a cross-sectional view of the region of the lead tab 51 including the fuse 71, taken along the line VI-VI of FIG. 5. Referring to FIGS. 5 and 6, the fuse 71 includes a plurality of sub-fuses 711 defined along a width (e.g., a y-axis direction) of the second connection part 512 by a plurality of through holes H7 formed in the second connection part 512.

In one embodiment, the fuse 71 has a second thickness t2 which is less than a first thickness t1 of the second connection part 512. The second connection part 512 includes an inclined surface 712 formed on at least one side of the fuse 71 in the length direction (e.g., an x-axis direction) intersecting the width direction (e.g., the y-axis direction). The inclined surface 712 connects from the surface of the sub-fuses 711 to the surface of the second connection part 512. Due to the inclined surface 712, the fuse 71 is made thinner than the second connection part 512.

In one exemplary embodiment, the inclined surface 712 is formed symmetrically on both sides of the sub-fuses 711. Also, the inclined surface 712 may be formed on one side of the second connection part 512 in the thickness direction (e.g., the z-axis). Accordingly, the sub-fuses 711 are concentrated on one side of the second connection part 512 in the thickness direction (e.g., the z-axis). In one embodiment, as shown in FIG. 6, the sub-fuses 711 are disposed at the lower side of the second connection part 512 in the thickness direction.

In one embodiment, the through holes H7 have a same hole width WH, and the sub-fuses 711 have a same line width WL. The hole width WH and the line width WL may define the sub-fuses 711 according to the melting condition of the fuse 71. The line width WL and the second thickness t2 define the cross-sectional area of each of the sub-fuses 711.

When the fuse 71 melts, the sub-fuses 711 may melt simultaneously or concurrently, or at time intervals depending on voltage conditions. If the sub-fuses 711 melt at time intervals, the arc energy between the melted sub-fuses 711 gradually decreases because the remaining sub-fuses 711 maintain the current path even if some of the sub-fuses 711 melt.

Taking the fuse 71 as a whole, the cross-sectional area of the sub-fuses 711, which allow current to flow, becomes smaller as the melting of the sub-fuses 711 proceeds. The sub-fuses 711 may melt sequentially, and the arc force is the highest at the last sub-fuse 711 that melts.

However, the last sub-fuse 711 to melt can contribute to minimizing or reducing arc length since it has the smallest cross-sectional area in the fuse 71. That is, the arc force is low at the initial melting phase, which results in a decreased arc length, and the cross-sectional area of the fuse 71 is small, which results in a decreased arc length. Accordingly, the sub-fuses 711 melted by the remains of the arc, which are generated by the melting of the sub-fuses 711, can be prevented or substantially prevented from being reconnected together.

Some other exemplary embodiments of the present invention are described below. Description of the same components as shown and described above with respect to the exemplary embodiment described above is not repeated below, and only the different components and aspects are explained.

Figure 7:
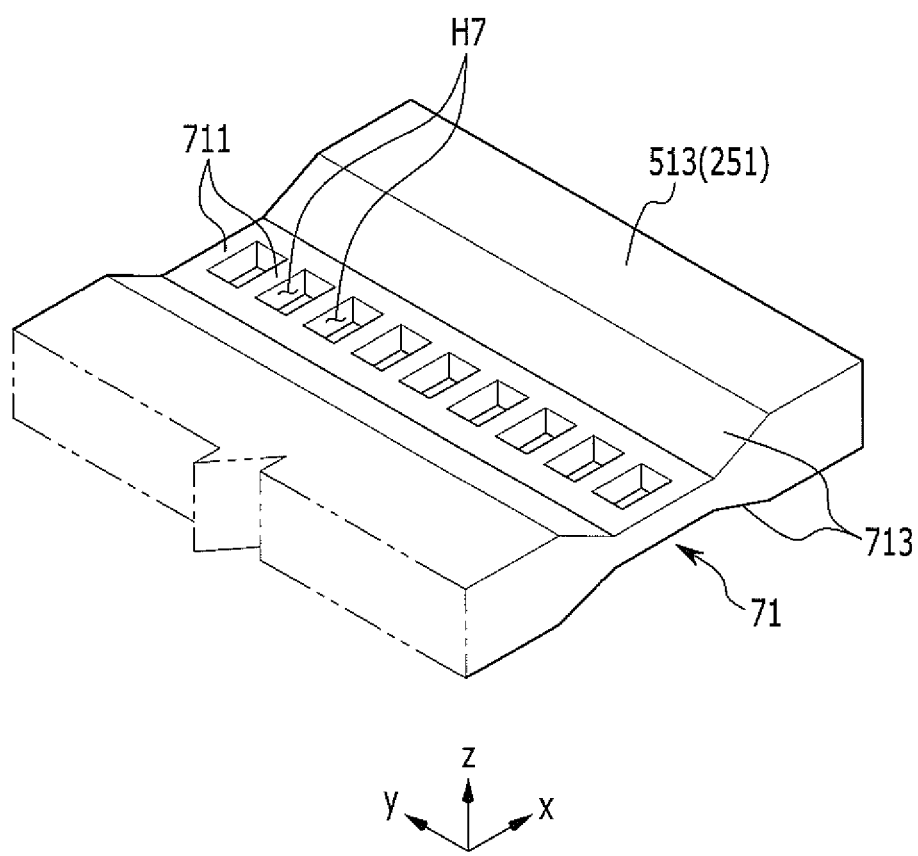
FIG. 7 is a perspective view of a region of a lead tab including a fuse of a rechargeable battery, in accordance with another exemplary embodiment of the present invention.

FIG. 7 is a perspective view of a region of a lead tab including a fuse of a rechargeable battery in accordance with another exemplary embodiment of the present invention. Referring to FIG. 7, in one embodiment, an inclined surface 713 is formed symmetrically on both sides of the sub-fuses 711, and is formed on both sides of a second connection part 513 of a lead tab 251 in a thickness direction (e.g., a z-axis direction).

Accordingly, the sub-fuses 711 are disposed in the center of the thickness (e.g., the z-axis) of the second connection part 513. That is, the same current path may be formed on both sides of the sub-fuses 711 in the thickness (e.g., the z-axis) direction of the second connection part 513.

Figure 8:
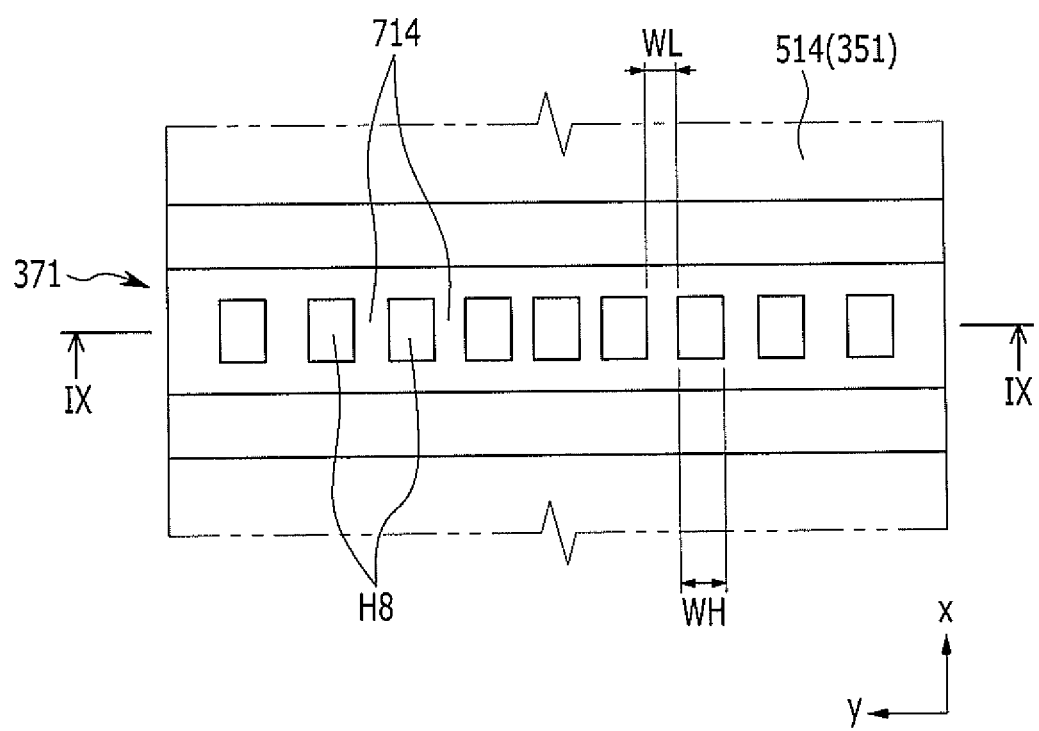
FIG. 8 is a top view of a region of a lead tab including a fuse of a rechargeable battery, in accordance with another exemplary embodiment of the present invention.
Figure 9:
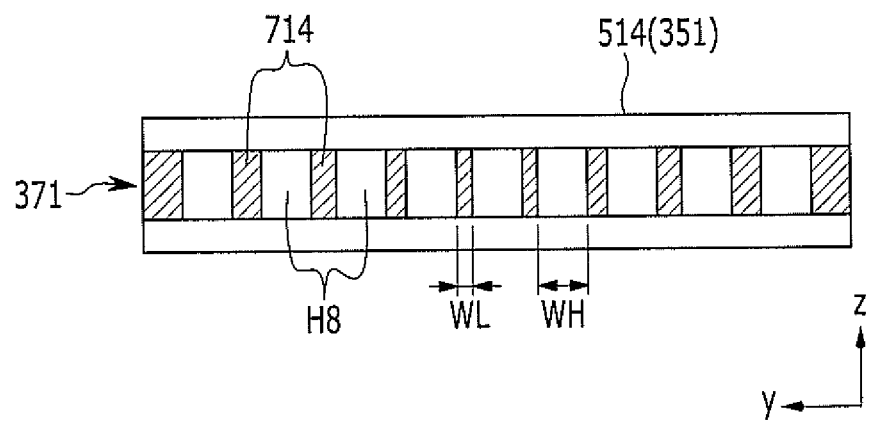
FIG. 9 is a cross-sectional view taken along the line IX-IX of FIG. 8.

FIG. 8 is a top view of a region of a lead tab including a fuse of a rechargeable battery, in accordance with another exemplary embodiment of the present invention. FIG. 9 is a cross-sectional view taken along the line IX-IX of FIG. 8. Referring to FIGS. 8 and 9, in a fuse 371 of a second connection part 514 of a lead tab 351 according to one embodiment, each of a plurality of through holes H8 has the same hole width WH, and sub-fuses 714 have different line widths WL.

In one embodiment, for example, the sub-fuses 714 have a smallest or minimum line width WL and a smallest cross-sectional area at a center along the width (e.g. the y-axis direction), gradually increase in line width from the center toward both sides, and have a maximum line width WL and a largest cross-sectional area at the outermost sides.

When the fuse 371 melts, the sub-fuses 714 disposed at the center melt faster than the others, and the sub-fuses 714 melt gradually from the center toward the outermost sides. Even if the sub-fuses 714 at the center having the smallest cross-sectional area melt, the arc energy between the melted sub-fuses 714 gradually decreases because the remaining sub-fuses 714 maintain the current path having a larger cross-sectional area.

Although not shown, in another embodiment, the sub-fuses may have a largest or maximum line width and largest cross-sectional area at the center along the width (e.g., the y-axis direction), gradually decrease in line width from the center toward both sides, and have a smallest or minimum line width and smallest cross-sectional area at the outermost sides.

In this case, when the fuse melts, the sub-fuses disposed at the outermost sides melt faster than the others, and the sub-fuses melt gradually from the outer sides toward the center. Even if the sub-fuses at the outermost sides having the smallest cross-sectional area melt, the arc energy between the melted sub-fuses gradually decreases because the remaining sub-fuses maintain the current path having a larger cross-sectional area.

Figure 10:
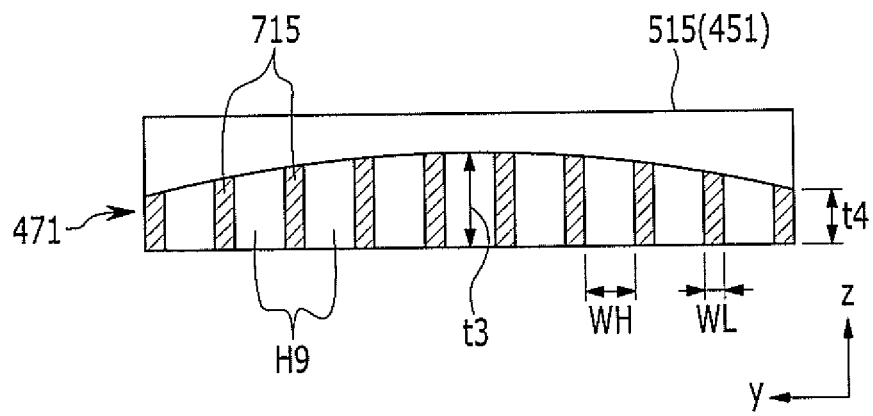
FIG. 10 is a cross-sectional view of a region of a lead tab including a fuse of a rechargeable battery, in accordance with another exemplary embodiment of the present invention.

FIG. 10 is a cross-sectional view of a region of a lead tab including a fuse of a rechargeable battery, in accordance with another exemplary embodiment of the present invention. Referring to FIG. 10, in a fuse 471 of a second connection part 515 of a lead tab 451 according to one embodiment, each of a plurality of through holes H9 has the same hole width WH, and each of a plurality of sub-fuses 715 has a same line width WL.

In one embodiment, the sub-fuses 715 have a largest or maximum thickness t3 and a largest cross-sectional area at a center along the width (e.g., the y-axis direction) of the fuse 471, gradually decrease in thickness from the center toward both sides, and have a smallest or minimum thickness t4 and a smallest cross-sectional area at the outermost sides.

When the fuse 471 melts, the sub-fuses 715 disposed at the outermost sides melt faster than the others, and the sub-fuses 715 melt gradually from the outer sides toward the center. Even if the sub-fuses 715 at the outermost sides having the smallest cross-sectional area melt, the arc energy between the melted sub-fuses 715 gradually decreases because the remaining sub-fuses 715 maintain the current path having a larger cross-sectional area.

Although not shown, in another embodiment, the sub-fuses may have a minimum thickness, or height, and a smallest cross-sectional area at the center along the width (e.g., the y-axis direction), gradually increase in thickness, or height, from the center toward both sides, and have a maximum thickness, or height, and a largest cross-sectional area at the outermost sides.

In this case, when the fuse melts, the sub-fuses disposed at the center melt faster than the others, and the sub-fuses melt gradually from the center toward the outermost sides. Even if the sub-fuses at the center having the smallest cross-sectional area melt, the arc energy between the melted sub-fuses gradually decreases because the remaining sub-fuses maintain the current path having a larger cross-sectional area.

Figure 11:
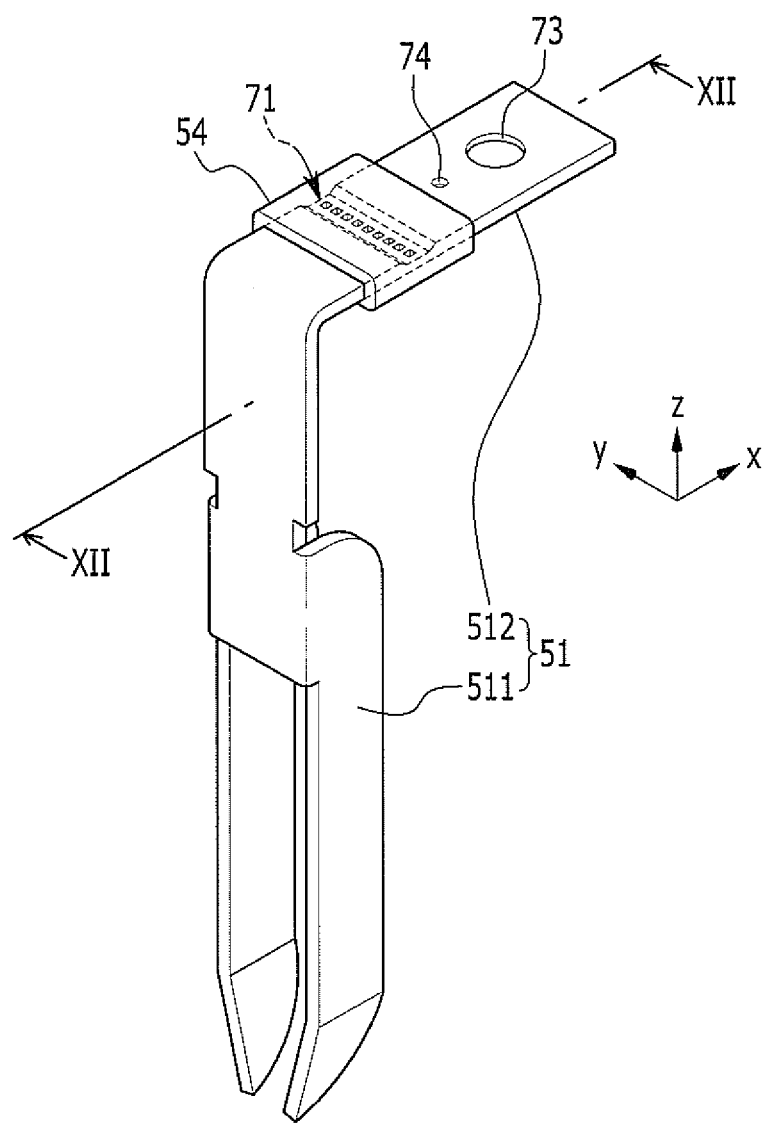
FIG. 11 is a perspective view of a lead tab of a rechargeable battery, in accordance with another exemplary embodiment of the present invention.
Figure 12:
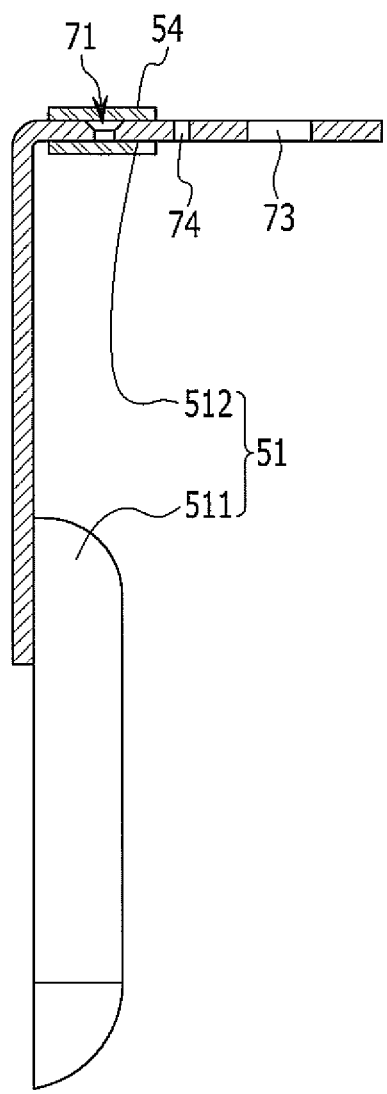
FIG. 12 is a cross-sectional view of the lead tab of FIG. 11, taken along the line XII-XII.

FIG. 11 is a perspective view of a lead tab of a rechargeable battery, in accordance with another exemplary embodiment of the present invention. FIG. 12 is a cross-sectional view of the lead tab of FIG. 11, taken along the line XII-XII. Referring to FIGS. 11 and 12, the second connection part 512 of the lead tab 51 according to one embodiment may include an insulator 54, such as an injection-molded product, in which the fuse 71 is embedded. The insulator 54, in one embodiment, may be formed of a magnetic insulating material.

When the fuse 71 melts, the insulator 54 holds the melting remains of the fuse 71 therein to prevent or substantially prevent damage to the electrode assembly 10 caused by the melting remains. In one embodiment, the insulator 54 has magnetic properties and thereby collects the melting remains around the second connection part 512, thus preventing or substantially preventing damage to the electrode assembly 10 caused by the melting remains.

While this invention has been described in connection with what are presently considered to be some exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly;
   a case accommodating the electrode assembly;
   a cap plate covering an opening of the case;
   an electrode terminal on the cap plate; and
   a lead tab connecting the electrode assembly to the electrode terminal, and comprising a fuse, the fuse comprising a plurality of sub-fuses defined along a width of the lead tab by a plurality of through holes formed in the lead tab,
   wherein the fuse has a second thickness that is less than a first thickness of a surrounding portion of the lead tab, and
   wherein the lead tab comprises an inclined surface extending on at least one side of the fuse in a lengthwise direction intersecting the width, and the inclined surface connects from a surface of the surrounding portion of the lead tab to a surface of the fuse.

2. The rechargeable battery of claim 1, wherein the inclined surface is on one surface of the lead tab in a thickness direction.

3. The rechargeable battery of claim 1, wherein the through holes have a same hole width, and the sub-fuses have a same line width.

4. The rechargeable battery of claim 3, wherein the sub-fuses are concentrated on one side of the lead tab in a thickness direction.

5. The rechargeable battery of claim 1, wherein the inclined surface is on both sides of the lead tab in a thickness direction.

6. The rechargeable battery of claim 5, wherein the sub-fuses are arranged at a center of a thickness of the lead tab.

7. The rechargeable battery of claim 1, wherein the through holes have a same hole width, and line widths of the sub-fuses gradually increase toward a side of the fuse.

8. The rechargeable battery of claim 1, wherein the through holes have a same hole width, and thicknesses of the sub-fuses gradually increase from one side of the fuse toward an opposite side of the fuse.

9. The rechargeable battery of claim 1, wherein the lead tab comprises an insulator in which the fuse is embedded.

10. The rechargeable battery of claim 9, wherein the insulator surrounds a perimeter of the fuse to collect melted portions of the fuse.

\* \* \* \* \*